US012668199B2

(12) United States Patent
Lindgren et al.

(10) Patent No.: US 12,668,199 B2
(45) Date of Patent: Jun. 30, 2026

(54) INSULATING ELEMENT

(71) Applicant: SIKA TECHNOLOGY AG, Baar (CH)

(72) Inventors: Henrik Lindgren, Feluy (BE); Dimitri Marcq, Tubize (BE)

(73) Assignee: SIKA TECHNOLOGY AG, Baar (CH)

( * ) Notice: Subject to any disclaimer, the term of this patent is extended or adjusted under 35 U.S.C. 154(b) by 485 days.

(21) Appl. No.: 18/017,952

(22) PCT Filed: Sep. 6, 2021

(86) PCT No.: PCT/EP2021/074503
§ 371 (c)(1),
(2) Date: Jan. 25, 2023

(87) PCT Pub. No.: WO2022/053433
PCT Pub. Date: Mar. 17, 2022

(65) Prior Publication Data
US 2023/0256919 A1 Aug. 17, 2023

(30) Foreign Application Priority Data

Sep. 14, 2020 (EP) .................................... 20195901

(51) Int. Cl.
B60R 13/08 (2006.01)
B62D 29/00 (2006.01)
(52) U.S. Cl.
CPC ........... B60R 13/08 (2013.01); B62D 29/002 (2013.01)
(58) Field of Classification Search
CPC ...................... B60R 2013/0807; B62D 29/002

USPC ......................................................... 181/264
See application file for complete search history.

(56) References Cited

U.S. PATENT DOCUMENTS

| | | | |
|---|---|---|---|
| 5,266,133 A | 11/1993 | Hanley et al. | |
| 5,373,027 A | 12/1994 | Hanley et al. | |
| 5,806,915 A * | 9/1998 | Takabatake | B60R 13/08 296/187.02 |
| 6,093,358 A * | 7/2000 | Schiewe | B29C 44/18 264/273 |
| 6,357,819 B1 * | 3/2002 | Yoshino | B62D 29/002 296/187.02 |
| 6,387,470 B1 | 5/2002 | Chang et al. | |

(Continued)

FOREIGN PATENT DOCUMENTS

| | | |
|---|---|---|
| CN | 101848831 A | 9/2010 |
| EP | 0 204 970 A2 | 12/1986 |

(Continued)

OTHER PUBLICATIONS

Dec. 20, 2021 International Search Report issued in International Patent Application No. PCT/EP2021/074503.

(Continued)

*Primary Examiner* — Jason S Morrow
(74) *Attorney, Agent, or Firm* — Oliff PLC

(57) ABSTRACT

An insulating element for insulating a structural element in a motor vehicle, including a carrier and an expandable material arranged on the carrier. The carrier has at least one dome and is designed in such a manner that, when stacking a plurality of identical insulating elements, respective domes of adjacent insulating elements engage in one another.

18 Claims, 4 Drawing Sheets

(56) References Cited

U.S. PATENT DOCUMENTS

| | | | | |
|---|---|---|---|---|
| 6,786,533 B2 * | 9/2004 | Bock | ................... | B62D 29/002 |
| | | | | 296/187.02 |
| 8,079,442 B2 * | 12/2011 | Wojtowicki | ............ | B60R 13/08 |
| | | | | 296/187.02 |
| 8,215,704 B2 * | 7/2012 | Monnet | ................ | B62D 29/002 |
| | | | | 296/193.06 |
| 8,523,272 B1 * | 9/2013 | Pettus | .................... | B62D 25/16 |
| | | | | 296/187.02 |
| 8,967,327 B2 * | 3/2015 | Synnestvedt | ........ | B62D 29/002 |
| | | | | 220/563 |
| 8,998,688 B2 * | 4/2015 | Niezur | ................... | B62D 25/24 |
| | | | | 454/162 |
| 10,604,193 B2 * | 3/2020 | Halang | ................. | B62D 25/14 |
| 10,940,896 B2 * | 3/2021 | Richardson | ............. | B29C 44/18 |
| 2005/0285292 A1 * | 12/2005 | Mendiboure | ..... | B29C 45/14795 |
| | | | | 264/45.1 |
| 2010/0320028 A1 | 12/2010 | Wojtowicki | | |

FOREIGN PATENT DOCUMENTS

| | | | |
|---|---|---|---|
| EP | 1 006 022 A2 | 6/2000 | |
| WO | 2005/080524 A1 | 9/2005 | |
| WO | 2007/057677 A1 | 5/2007 | |
| WO | 2009/021537 A1 | 2/2009 | |
| WO | 2012/143305 A1 | 10/2012 | |
| WO | 2021/069120 A1 | 4/2021 | |

OTHER PUBLICATIONS

Mar. 7, 2023 International Preliminary Report on Patentability issued in International Patent Application No. PCT/EP2021/074503.

* cited by examiner

INSULATING ELEMENT

The invention relates to an insulating element for sealing off a structural element in a motor vehicle. The invention furthermore relates to a system having a plurality of such insulating elements and to a method for attaching such insulating elements to structural elements.

Components, for example bodies and/or frames of transportation and conveyance means, in particular of aquatic or terrestrial vehicles or of aircraft, frequently have structures with cavities in order to make lightweight constructions possible. However, these cavities cause a wide variety of problems. Depending on the type of the cavity, the latter has to be sealed in order to prevent the ingress of moisture and dirt, which can lead to the corrosion of the components. It is often also desirable to substantially reinforce the cavities, and thus the component, but to retain the low weight. It is often also necessary to stabilize the cavities, and thus the components, in order to reduce noises which would otherwise be transmitted along or through the cavity. Many of these cavities have an irregular shape or a narrow extent, making it more difficult to seal, reinforce and insulate them properly.

In particular in automotive construction, but also in aircraft construction and boat building, sealing elements (baffles) are therefore used in order to seal and/or acoustically insulate cavities, or reinforcing elements (reinforcers) are used in order to reinforce cavities.

FIG. 1 schematically illustrates a body of an automobile. In this case, the vehicle body 10 has various structures with cavities, for example pillars 14 and carriers or braces 12. Such structural elements 12, 14 with cavities are usually sealed or reinforced with insulating elements 16.

A disadvantage of the previously known sealing and/or reinforcing elements is that such parts often cannot be packed efficiently. Furthermore, when such parts are being transported, individual parts are repeatedly mixed up and damaged.

It is therefore an object of the present invention to provide an improved insulating element for sealing off a structural element in a motor vehicle, which avoids the disadvantages of the prior art. In particular, the insulating element should be able to be packed and transported more economically.

This object is achieved by an insulating element for sealing off a structural element in a motor vehicle, the insulating element comprising: a carrier; and an expandable material that is arranged on the carrier; wherein the carrier has at least one cap and is formed in such a way that, when a plurality of identical insulating elements are stacked, respective caps of adjacent insulating elements engage in one another.

Firstly, this solution has the advantage that it provides an insulating element which is designed to be stackable. As a result, such insulating elements can be stacked on top of one another for transport and packed and transported in the stacked state. On the one hand, this saves on transport costs because it allows the insulating elements to be packed in a more space-saving manner, with the result that in a given volume more insulating elements can be transported than was the case with conventional insulating elements. In addition, stacking such insulating elements offers the advantage that mixups between different insulating elements can be identified more easily. If, for example, a first insulating element is packed in a container with a plurality of second insulating elements, this is immediately noticeable because the first insulating element generally cannot be stacked with the second insulating elements. This makes it possible to greatly reduce mixups.

The stackable insulating element proposed here furthermore offers the advantage that the individual insulating elements cannot be damaged as easily owing to the stacked arrangement for transport and storage. Specifically, if the individual insulating elements are transported loosely in a container as before, the insulating elements will come into contact with one another many times, and damage can occur from time to time. However, if the insulating elements are transported in stacks, the number of times the insulating elements make mechanical contact with one another is greatly reduced. In addition, the insulating elements may be configured in such a way that the intended locations of contact have a robust form and/or one that is less prone to damage, and/or that locations of the insulating elements that are easier to damage are arranged at protected points which, for example, are covered by the adjacent insulating elements when stacked.

Furthermore, the stackable insulating element proposed here offers the advantage that automated attachment of the insulating elements to structural elements in motor vehicles is facilitated. For example, entire stacks of such insulating elements can be loaded into a robot, which then removes the individual insulating elements from this stack and correspondingly attaches them to the structural elements. In the case of loosely arranged insulating elements in a container, such an automated attachment of the insulating elements is significantly more difficult to accomplish.

The provision of one or more caps affords the advantage that, on the one hand, it improves the stackability of the insulating elements in that caps of adjacent insulating elements engage in one another when the stack is being formed. As a result, the stacked insulating elements are mechanically secured against lateral displacement, and moreover a stack height is kept as small as possible, in that the insulating elements engage in one another in a space-saving manner.

These caps moreover have the advantage that they make manipulation by an application robot easier and more efficient. For example, a gripper of a robot can grip and manipulate the insulating elements directly at a cap. In the case of insulating elements with a plurality of caps, a corresponding plurality of grippers can be used.

In the context of this invention, the term "insulating element" comprises elements for closing off and/or sealing off and/or closing and/or reinforcing and/or insulating a structural element. These various characteristics of such an insulating element can arise individually or in combination with one another.

In the context of this invention, the term "cap" comprises in particular moldings or bulges on the carrier of the insulating element with a hollow interior and an open side. In this respect, such a cap may have, for example, a hemisphere-like, dome-like, cube-like, cylinder-like, cone-like, or irregular shaping.

In the context of this invention, the terms "top side" and "bottom side" mean the two main surfaces or the two largest side surfaces of the insulating element. Since the insulating elements are designed to close a cross section in a structural element, this means that the top side and the bottom side are each substantially in a plane of a cross section to be sealed off in a state of use. In this respect, the top side and the bottom side may also have a step-shaped character, that is to say it is not necessary for the top side and the bottom side to have a completely flat form.

In the context of this invention, the term "parallel" in relation to the arrangement of insulating elements in a stack of a plurality of identical insulating elements means that the same surfaces and/or edges of the identical insulating elements are respectively arranged substantially parallel to one another.

In one exemplary embodiment, the insulating element has exactly three contact points on each of the top side and the bottom side, which contact points lie on one another when adjacent insulating elements are stacked.

In an alternative refinement, the insulating element has exactly four or at least four such contact points on the top side and on the bottom side.

In a further alternative embodiment, the insulating element has exactly five or at least five such contact points on the top side and on the bottom side.

In one exemplary embodiment, at least one contact point on the top side and an assigned contact point on the bottom side are formed in such a way that adjacent insulating elements are secured against horizontal displacement when stacking occurs in the vertical direction.

In one exemplary refinement, at least one contact point on the top side and an assigned contact point on the bottom side are formed in such a way that there is a mechanical locking between the corresponding contact points when stacking occurs.

In an exemplary embodiment, the cap forms at least one of these contact points.

In one exemplary embodiment, at least one contact point lies in a region of a fixing element.

In the context of this invention, the "region of a fixing element" is understood to mean the fixing element itself, a base of the fixing element, and the expandable material at the base of the fixing element that is required to seal off the opening in the structural element in which the fixing element is inserted.

In one exemplary embodiment, the fixing element is in the form of a clip.

In one exemplary embodiment, a height of the fixing element in a stacking direction is less than 8 mm, preferably less than 7 mm, particularly preferably less than 6 mm.

In one exemplary embodiment, a height at the base of the fixing element in the stacking direction that includes both a base of the fixing element and the expandable material at the base of the fixing element that is required to seal off the opening in the structural element in which the fixing element is inserted is at most 130% or at most 120% or at most 110% of a height of the fixing element in the stacking direction.

The advantage of the configuration of such relative heights is that it allows the insulating elements to be packed in a more space-saving manner.

In one exemplary embodiment, at least one contact point is in the form of a spacer element, wherein the spacer element serves to support and/or position the insulating element on the structural element in a state of use of the insulating element in the structural element.

In one exemplary refinement, the spacer element is configured to be stackable per se, wherein two spacer elements stacked one inside the other have a total height in the stacking direction of at most 170% or at most 160% or at most 150% or at most 140% or at most 130% of a height of an individual spacer element.

In one exemplary embodiment, steps of the carrier form an angle to the stacking direction of at least 35° or at least 40° or at least 45° or at least 50° or at least 55°.

The advantage of steps configured in this way is that insulating elements with flatter steps can be stacked more readily than would be the case with steeper steps. In the case of steeper steps, there is the problem in particular that adjacent insulating elements cannot be arranged vertically one above another without a horizontal offset.

In one exemplary embodiment, a step of the carrier and at least one cap are formed in such a way that the cap together with the step form a support surface which is parallel to a plane of the top side and bottom side of the carrier.

In one exemplary embodiment, the insulating element comprises a step and two caps, which together form such a support surface.

This makes it possible to place such insulating elements directly onto a planar surface and stack them on top of one another, with a stacking direction being aligned perpendicularly to this planar surface.

In an alternative embodiment, the insulating element has three caps, which together form a support surface which is parallel to a plane of the top side and bottom side of the carrier.

This makes it possible in turn to stack insulating elements directly onto planar surfaces.

In a further alternative embodiment, the insulating element has two caps, which together form a support surface which is parallel to a plane of the top side and bottom side of the carrier.

In a further alternative embodiment, the insulating element has one cap, the cap roof forming a support surface which is parallel to a plane of the top side and bottom side of the carrier.

In one exemplary embodiment, all of the contact points or individual contact points are formed by the carrier.

In one exemplary embodiment, individual contact points are formed by the expandable material.

In a further embodiment, at least one contact point is formed by the carrier, and at least one contact point is formed by the expandable material.

Since the carrier can generally be produced with smaller tolerances than the expandable material, it may be advantageous for the carrier to form the contact points as far as possible.

In one exemplary embodiment, the insulating element has at least one securing element, which is formed in such a way that, when the insulating elements are stacked on top of one another, an insulating element is secured by the securing element of an adjacent insulating element against displacement transversely to the stacking direction and/or against rotation of the insulating element about the stacking direction.

In one exemplary embodiment, the securing element is formed in such a way that, when the insulating elements are stacked on top of one another, the securing elements of two adjacent insulating elements overlap in the stacking direction.

In one exemplary refinement, the securing elements overlap in the stacking direction by at least 3 mm or by at least 5 mm or by at least 7 mm.

In one exemplary embodiment, the securing element has at least one guide surface, which is formed such that, when stacking occurs, the guide surface guides an insulating element to be stacked, with the result that the newly stacked insulating element is arranged on the insulating element substantially congruently in the stacking direction.

In one exemplary embodiment, at least one spacer element is configured as a securing element.

In one exemplary refinement, the spacer element has a substantially Y-shaped configuration. For example, in this case individual surfaces of the legs of the Y-shaped spacer element may be in the form of a guide surface.

In an alternative refinement, the spacer element is substantially U-shaped or V-shaped. In turn, in this case individual surfaces of the legs of the U-shaped or V-shaped spacer element may be in the form of a guide surface.

In one exemplary embodiment, at least one step is configured as a securing element.

In one exemplary embodiment, at least one region of a fixing element is configured as a securing element.

In one exemplary refinement, a base of the fixing element is configured as a securing element. This base may, for example, have a substantially U-shaped form. In turn, in this case individual surfaces of the legs of the U-shaped base of the fixing element may be in the form of guide surfaces.

In one exemplary embodiment, at least one cap is in the form of a securing element.

In one exemplary embodiment, all of the securing elements or individual securing elements are formed by the carrier.

In an alternative embodiment, individual securing elements are formed by the expandable material.

In a further embodiment, at least one securing element is formed by the carrier, and at least one securing element is formed by the expandable material.

Since the carrier can generally be produced with smaller tolerances than the expandable material, it may be advantageous for the carrier to form the securing elements as far as possible.

In one exemplary embodiment, the insulating element has a top side and a bottom side which, in a state of use, are aligned substantially in a plane of a cross section of the structural element that is to be sealed off.

In one exemplary embodiment, an open side of the cap and/or a roof of the cap is aligned substantially parallel to the top side and bottom side of the insulating element.

In one exemplary embodiment, a side wall of the cap projects beyond only the bottom side in a stacking direction.

In an alternative embodiment, a side wall of the cap projects beyond only the top side in a stacking direction.

In a further alternative embodiment, a side wall of the cap projects beyond both the bottom side and the top side in a stacking direction.

In one exemplary embodiment, a cross section of the cap is substantially trapezoidal.

In an alternative embodiment, a cross section of the cap is substantially arcuate, dome-shaped, semicircular, rectangular, triangular, or irregularly shaped.

In one exemplary embodiment, the cap has a substantially circular, elliptical or oval base surface.

In one exemplary embodiment, the carrier has at least two caps or at least three caps.

In one exemplary refinement, two caps have a different outline.

In one exemplary embodiment, the cap is formed in such a way that, when a plurality of identical insulating elements are stacked, respective caps of adjacent insulating elements lie on one another.

In one exemplary embodiment, the cap has at least one stopper which defines a support location when a stack is being formed.

In one exemplary refinement, the stopper is arranged on the side wall of the cap. In this respect, the stopper may be arranged on an inner side of the side wall or else on an outer side of the side wall.

In one exemplary embodiment, a maximum cap height in the stacking direction is between 5 mm and 40 mm, pref-erably between 7 mm and 35 mm, preferably between 7 mm and 30 mm, preferably between 10 mm and 30 mm.

In an alternative embodiment, in particular in combination with the use of steps in the carrier, higher caps can be used, with a maximum cap height in the stacking direction being between 10 mm and 80 mm, preferably between 20 and 70 mm.

In one exemplary embodiment, a maximum cap width on the open side of the cap, as measured perpendicularly to the stacking direction, is between 5 mm and 40 mm, preferably between 5 mm and 30 mm, preferably between 5 mm and 25 mm, preferably between 5 mm and 20 mm.

In one exemplary embodiment, a maximum cap width on the cap roof, as measured perpendicularly to the stacking direction, is between 3 mm and 35 mm, preferably between 3 mm and 25 mm, preferably between 3 mm and 20 mm, preferably between 3 mm and 15 mm.

In one exemplary embodiment, the maximum cap width on the cap roof, as measured perpendicularly to the stacking direction, is at most 95%, preferably at most 90%, preferably at most 85%, preferably at most 80%, preferably at most 75%, preferably at most 70%, preferably at most 65%, preferably at most 60%, preferably at most 55%, preferably at most 50% of the maximum cap width on the open side of the caps, as measured perpendicularly to the stacking direction.

In one exemplary embodiment, the stack height of an insulating element is at most 80%, preferably at most 70%, preferably at most 60%, preferably at most 50% of the cap height.

In principle, various materials that can be made to foam can be used as the expandable material. In this case, the material may or may not have reinforcing properties. Typically, the expandable material is made to expand thermally, by moisture or by electromagnetic radiation.

Such an expandable material typically has a chemical or a physical foaming agent. Chemical foaming agents are organic or inorganic compounds which decompose under the influence of temperature, moisture or electromagnetic radiation, wherein at least one of the decomposition products is a gas. Compounds which pass into the gaseous state of matter when the temperature is increased may be used for example as physical foaming agents. As a result, both chemical and physical foaming agents are capable of creating foam structures in polymers.

The expandable material is preferably foamed thermally, with chemical foaming agents being used. Examples of suitable chemical foaming agents are azodicarbonamides, sulfohydrazides, hydrogen carbonates or carbonates.

Suitable foaming agents are, for example, also commercially available under the trade name Expancel® from Akzo Nobel, the Netherlands, or under the trade name Celogen® from Chemtura Corp., USA.

The heat required for the foaming can be introduced by external or by internal heat sources, such as an exothermic chemical reaction. The foamable material is preferably foamable at a temperature of <250° C., in particular from 100° C. to 250° C., preferably from 120° C. to 240° C., preferably from 130° C. to 230° C.

Suitable expandable materials are, for example, one-component epoxy resin systems which do not flow at room temperature and in particular have increased impact resistance and contain thixotropic agents such as aerosils or nanoclays. For example, epoxy resin systems of this type include 20 to 50% by weight of a liquid epoxy resin, 0 to 30% by weight of a solid epoxy resin, 5 to 30% by weight of impact modifiers, 1 to 5% by weight of physical or chemical foaming agents, 10 to 40% by weight of fillers, 1 to 10% by weight of thixotropic agents and 2 to 10% by weight of heat-activatable catalysts. Suitable impact modifiers are reactive liquid rubbers based on nitrile rubber or derivatives of polyether polyol polyurethanes, core-shell polymers and similar systems known to a person skilled in the art.

Likewise suitable expandable materials are one-component polyurethane compositions containing foaming agents and based on crystalline polyesters which comprise OH groups and have been mixed with further polyols, preferably polyether polyols, and polyisocyanates with blocked isocyanate groups. The melting point of the crystalline polyester should be >50° C. The isocyanate groups of the polyisocyanate can be blocked for example by nucleophiles such as caprolactam, phenols or benzoxalones. Also suitable are blocked polyisocyanates as are used, for example, in powder-coating technology and are commercially available, for example, under the trade names Vestagon® BF 1350 and Vestagon® BF 1540 from Degussa GmbH, Germany. Suitable isocyanates are also so-called encapsulated or surface-deactivated polyisocyanates, which are known to a person skilled in the art and are described, for example, in EP 0 204 970.

Also suitable as expandable materials are two-component epoxy/polyurethane compositions which contain foaming agents, as are described, for example, in WO 2005/080524 A1.

Also suitable as expandable materials are ethylene-vinyl acetate compositions containing foaming agents.

Expandable materials that are also suitable are marketed by Sika Corp., USA, for example under the trade name SikaBaffle® 240, SikaBaffle® 250 or SikaBaffle® 255, and are described in patents U.S. Pat. Nos. 5,266,133 and 5,373,027. Such expandable materials are particularly preferred for the present invention.

Preferred expandable materials having reinforcing properties are, for example, those which are marketed under the trade name SikaReinforcer® 941 by Sika Corp., USA. These are described in U.S. Pat. No. 6,387,470.

In one exemplary embodiment, the expandable material has an expansion rate from 800% to 5000%, preferably from 1000% to 4000%, particularly preferably from 1500% to 3000%. Expandable materials having such expansion rates afford the advantage that, as a result, reliable sealing and/or sealing off of the structural element with respect to liquids and sound can be achieved.

In one exemplary embodiment, the expandable material is in the form of a temperature-stimulated material.

This has the advantage that, as a result, the furnace for baking the dip coating liquid can be used to expand the expandable material and to thus seal off the cavity. Consequently, an additional work step is not necessary.

The carrier may consist of any desired materials. Preferred materials are plastics, in particular polyurethanes, polyamides, polyesters and polyolefins, preferably polymers which can withstand high temperatures such as poly(phenylene ethers), polysulfones or polyether sulfones, which in particular are also foamed; metals, in particular aluminum and steel; or grown organic materials, in particular wood materials or other (densified) fibrous materials, or glass-type or ceramic materials; especially also foamed materials of this type; or any desired combinations of these materials. Polyamide, in particular polyamide 6, polyamide 6.6, polyamide 11, polyamide 12, or a mixture thereof, is particularly preferably used.

Furthermore, the carrier may be solid, hollow or foamed or have a grid-like structure, for example. Typically, the surface of the carrier can be smooth, rough or structured.

In the case of insulating elements in which the expandable material is located on a carrier, the production process differs according to whether the carrier consists or does not consist of a material that can be processed by injection molding. If this is the case, a two-component injection molding process is usually used. Here, first of all a first component, in this case the carrier, is injected. After said first component has solidified, the cavity in the mold is enlarged, or adapted, or the molding produced is placed into a new mold, and a second component, in this case the expandable material, is overmolded onto the first component by a second injection apparatus.

If the carrier consists of a material that cannot be produced by the injection molding process, that is to say for example consists of a metal, the carrier is placed into a corresponding mold and the expandable material is overmolded onto the carrier. Of course, it is also possible to fasten the expandable material to the carrier by specific fastening means or processes.

Furthermore, carriers can also be produced by other processes, for example by extrusion.

The insulating element has a stack height which corresponds to an additional height in the stacking direction of a stack having insulating elements by which the stack grows when a further insulating element is stacked onto the stack.

In one exemplary embodiment, a stack height of the insulating element is at most 80%, preferably at most 70%, preferably at most 60%, preferably at most 50%, preferably at most 40%, preferably at most 30%, of a total height of an individual insulating element in the stacking direction.

This has the advantage that it allows the insulating elements to be arranged in a stack in a more space-saving manner. A stronger vertical nesting of adjacent insulating elements in a stack moreover improves the stability of the overall stack.

The object set out in the introduction is moreover achieved by a system having a plurality of such insulating elements, wherein the insulating elements are stacked on top of one another.

In one exemplary embodiment, the system comprises at least 10 or at least 15 or at least 20 or at least 25 or at least 30 stacked insulating elements.

In a further exemplary embodiment, the system comprises at most 150 or at most 120 or at most 100 or at most 80 or at most 60 stacked insulating elements.

In one exemplary embodiment, the lowermost insulating element of the stack lies on a base element.

The provision of such a base element has the advantage that it allows a stack of insulating elements to be placed on a surface. Moreover, such base elements can be used for an automated process.

In one exemplary embodiment, each additional insulating element increases the height of the stack by at most 20 mm, particularly preferably by at most 18 mm, particularly preferably by at most 16 mm, particularly preferably by at most 14 mm, particularly preferably by at most 12 mm, particularly preferably by at most 10 mm.

The tight stacking of insulating elements has the advantage that it allows the insulating elements to be packed more efficiently.

In one exemplary embodiment, a stack height of an individual insulating element is at most 80%, preferably at most 70%, preferably at most 60%, preferably at most 50%, preferably at most 40%, preferably at most 30%, of a total height of an individual insulating element in the stacking direction.

The tight stacking of insulating elements in turn has the advantage that it allows the insulating elements to be packed more efficiently.

In one exemplary embodiment, the stack height of an insulating element is at most 80%, preferably at most 70%, preferably at most 60%, preferably at most 50% of the cap height.

The object set out in the introduction is moreover achieved by a method for attaching insulating elements to structural elements in motor vehicles, the method comprising the steps of: providing a system having stacked insulating elements according to the description above; and manipulating the insulating elements by means of an application robot, wherein at least one cap serves as positioning aid for the application robot.

In one exemplary embodiment, the application robot is loaded with a plurality of systems at the same time.

In one exemplary embodiment, the individual insulating elements are removed by the robot arm.

In one exemplary embodiment, a gripper of the application robot grips the insulating elements at the cap during the manipulation.

In one exemplary embodiment, the insulating elements have at least two caps, the two caps serving as positioning aids during a manipulation.

Details and advantages of the invention will be described below on the basis of exemplary embodiments and with reference to schematic drawings, in which.

Figure 1:
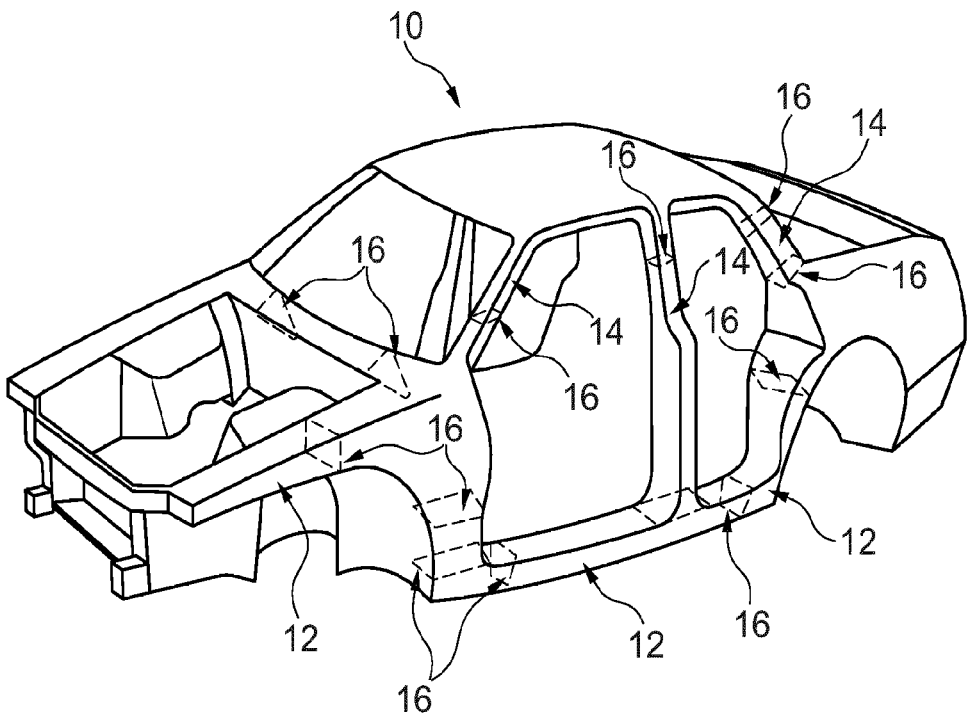
FIG. 1 shows an exemplary illustration of a vehicle body.
Figures 2A, 2B, 3A, 3B:
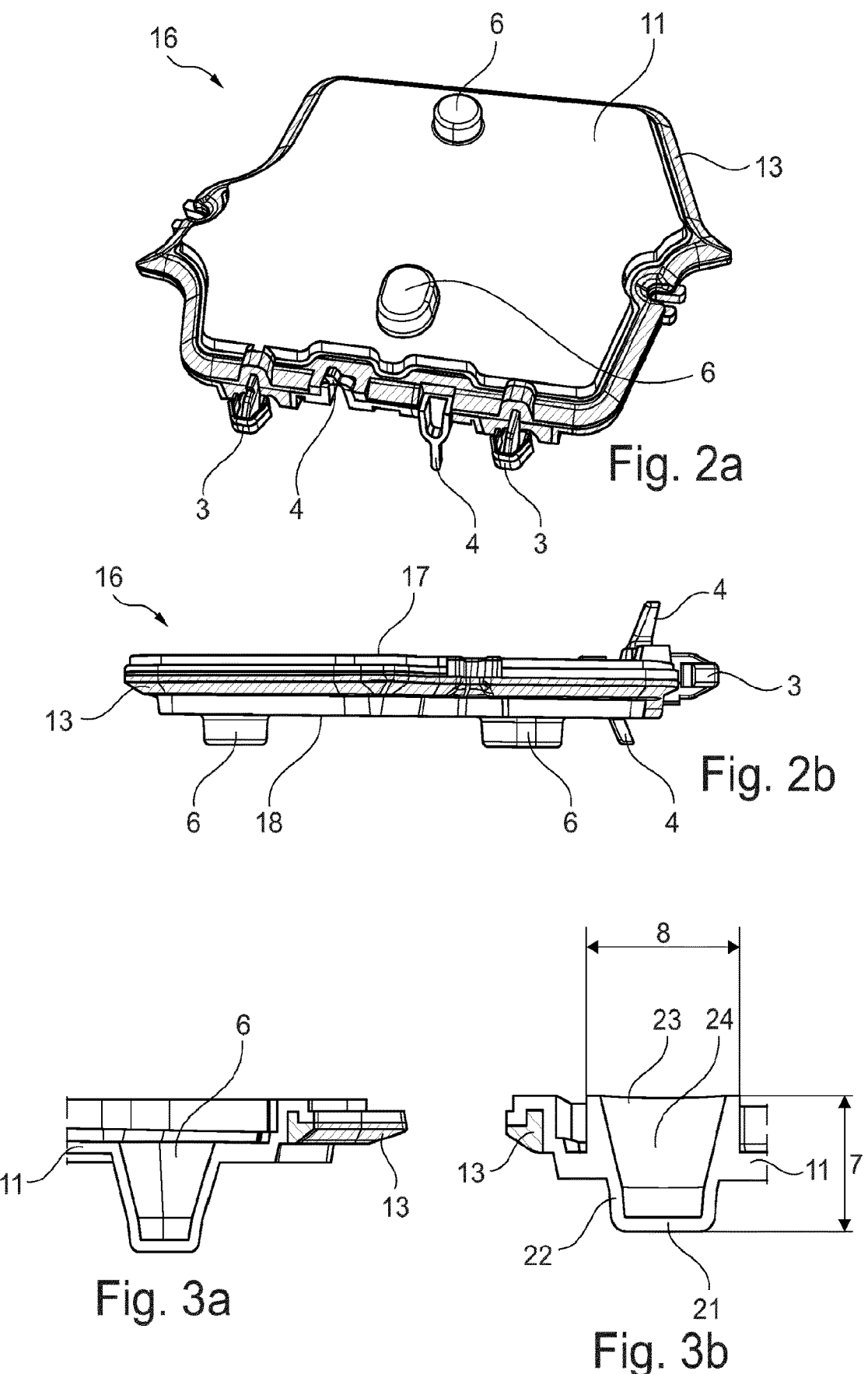
FIGS. 2a and 2b show schematic illustrations of an exemplary insulating element.
FIGS. 3a and 3b show schematic illustrations of exemplary caps.

FIGS. 2a and 2b schematically illustrate an exemplary insulating element 16. The insulating element 16 comprises a carrier 11 and an expandable material 13 arranged thereon. The carrier 11 has a top side 17 and a bottom side 18. Furthermore, the carrier 11 has two caps 6, with the caps 6 having different outlines in this exemplary embodiment. One cap 6 has a circular outline, and one cap 6 has an oval outline. Furthermore, the insulating element 16 comprises spacers 4 and fixing elements 3 for prefixing the insulating element 16 in a structural element.

FIGS. 3a and 3b each illustrate a cap 6 in cross section by way of example. In FIG. 3a, a side wall 22 of the cap 6 projects beyond only the bottom side 18 of the carrier 11, and, in FIG. 3b, the side wall 22 of the cap 6 projects beyond both the bottom side 18 and the top side 17 of the carrier 11.

The cap 6 has a cap width 8, measured on an open side 23 of the cap 6 and perpendicularly to the stacking direction. Furthermore, the cap 6 has a cap height 7, measured in the stacking direction. Moreover, the cap 6 has a cap cavity 24 and a cap roof 21.

Figure 4A:
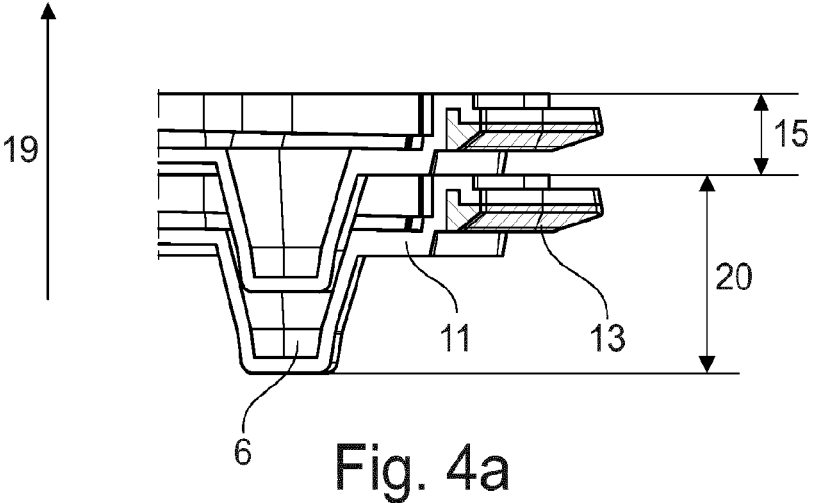
FIGS. 4a to 4c show schematic illustrations of exemplary stacked insulating elements.
Figure 4B:
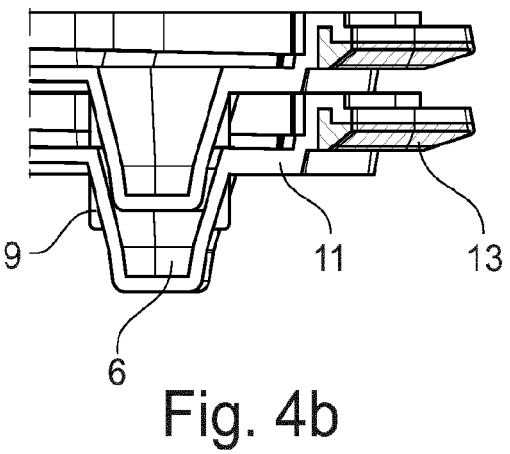
Figure 4C:
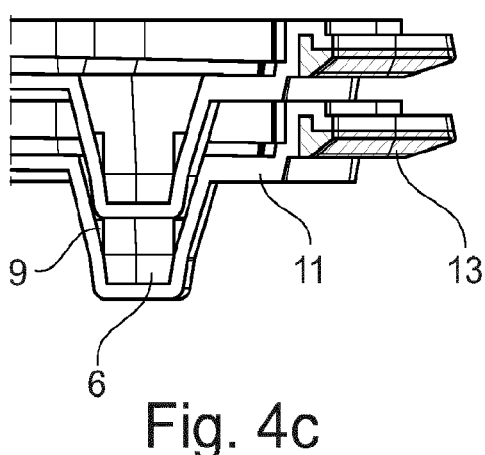

FIGS. 4a to 4c each illustrate a detail of a stack consisting of two insulating elements 16.

The stacking direction 19 is identified in FIG. 4a. Moreover illustrated are a height 20 of the insulating element 16, and a stack height 15 of an insulating element 16.

In FIG. 4b, the insulating elements 16 have stoppers 9 on an outer side of the cap wall 22. In this respect, the stoppers 9 are formed and arranged in such a way that, when a stack is being formed, the insulating elements 16 each lie on one another on these stoppers 9.

FIG. 4c illustrates an alternative embodiment variant in which the stoppers 9 are arranged on an inner side of the cap wall 22. In turn, the stoppers 9 are formed and arranged in such a way that, when a stack is being formed, the insulating elements 16 each lie on one another on these stoppers 9.

Figures 5, 6A, 6B:
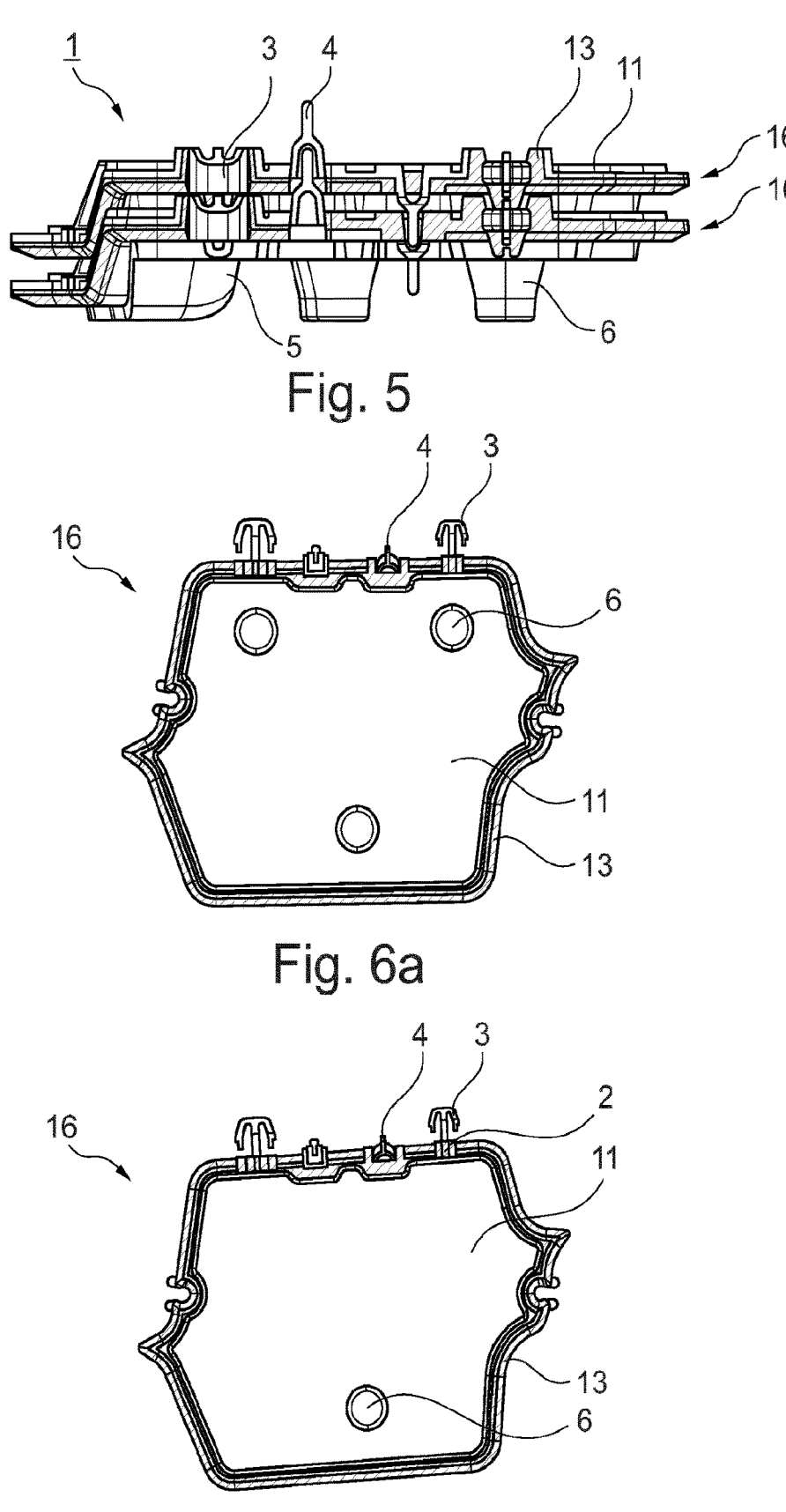
FIG. 5 shows a schematic illustration of an exemplary stack with two insulating elements.
FIGS. 6a and 6b show schematic illustrations of exemplary insulating elements.

FIG. 5 illustrates a stack 1 consisting of two insulating elements 16. In this exemplary embodiment, the insulating elements 16 have a respective step 5. In the stacked state, the adjacent insulating elements 16 engage in one another, this sliding-over being present in the regions of the step 5, the caps 6, the spacers 4 and the fixing elements 3. Furthermore, the insulating elements 16 are configured in such a way that, when an insulating element 16 is arranged on a planar surface, the insulating element 16 lies in such a way that a main plane of the carrier 11 is substantially parallel to the planar surface. The step 5 of the carrier 11 and the caps 6 are formed in such a way that the caps 6 together with the step 5 form a support surface which is parallel to a plane of the top side and bottom side of the carrier 11.

Lastly, FIGS. 6a and 6b schematically illustrate two different exemplary embodiments relating to the contact points of the insulating elements 16.

In the example according to FIG. 6a, the insulating element 16 has three caps 6, which act as three contact points.

In the example according to FIG. 6b, the insulating element 16 has one cap 6, which acts as one of the three contact points. Moreover, the insulating element 16 has two further contact points in the region of the fixing elements 3; in this exemplary embodiment, the bases 2 of the fixing elements 3 are in the form of contact points.

LIST OF REFERENCE SIGNS

1 Stack
2 Base of the fixing element
3 Fixing element
4 Spacer element
5 Step
6 Cap
7 Cap height
8 Cap width
9 Stopper
10 Vehicle body
11 Carrier
12 Structural element
13 Expandable material
14 Structural element
15 Stack height of an insulating element
16 Insulating element
17 Top side
18 Bottom side
19 Stacking direction
20 Height of the insulating element
21 Cap roof
22 Cap wall
23 Open side of the cap
24 Cap cavity

The invention claimed is:

1. An insulating element for sealing off a structural element in a motor vehicle, the insulating element comprising:

a carrier; and an expandable material that is arranged on the carrier;

wherein the carrier has at least one cap that comprises a hollow interior and an open side and is formed such that, when a plurality of identical insulating elements are stacked, respective caps of adjacent insulating elements engage in one another concentrically such that the insulating elements are mechanically secured against lateral displacement.

2. The insulating element as claimed in claim 1, wherein the insulating element has a top side and a bottom side which, in a state of use, are aligned substantially in a plane of a cross section of the structural element that is to be sealed off, and wherein an open side of the cap and/or a roof of the cap is aligned substantially parallel to the top side and the bottom side, respectively, of the insulating element.

3. The insulating element as claimed in claim 1, wherein a side wall of the cap projects beyond only the bottom side in a stacking direction, or wherein a side wall of the cap projects beyond only the top side in a stacking direction, or wherein a side wall of the cap projects beyond both the bottom side and the top side in a stacking direction.

4. The insulating element as claimed in claim 1, wherein a step of the carrier and at least one cap are formed in such a way that the cap together with the step form a support surface which is parallel to a plane of the top side and bottom side of the carrier.

5. The insulating element as claimed in claim 1, wherein the cap has a substantially circular, elliptical or oval base surface.

6. The insulating element as claimed in claim 1, wherein the carrier has at least two caps.

7. The insulating element as claimed in claim 6, wherein the two caps have a different outline.

8. The insulating element as claimed in claim 1, wherein a stack height is at most 50% of a height of an insulating element, and/or wherein the stack height is at most 80% of a cap height.

9. The insulating element as claimed in claim 1, wherein the cap is formed in such a way that, when a plurality of identical insulating elements are stacked, respective caps of adjacent insulating elements lie on one another.

10. The insulating element as claimed in claim 9, wherein the cap has a stopper which defines a support location when a stack is being formed.

11. The insulating element as claimed in claim 1, wherein the insulating element has at least three contact points, via which adjacent insulating elements lie on one another when a stack is being formed, wherein the cap forms at least one of these contact points.

12. A system having a plurality of insulating elements as claimed in claim 1, wherein the insulating elements are stacked on top of one another with the respective caps of adjacent insulating elements engaging in one another.

13. The system as claimed in claim 12, wherein the system comprises at least 10 stacked insulating elements with the respective caps of adjacent insulating elements engaging in one another, and/or wherein a lowermost insulating element of the system lies on a base element, and/or wherein a stack height is at most 80% of a cap height.

14. A method for attaching insulating elements to structural elements in motor vehicles, the method comprising:

providing a system having stacked insulating elements as claimed in claim 12; and manipulating the insulating elements by an application robot, wherein at least one cap serves as a positioning aid for the application robot.

15. The method as claimed in claim 14, wherein, during the manipulation, a gripper of the application robot grips the insulating elements at the cap, and/or wherein the insulating elements have at least two caps, and wherein the two caps serve as positioning aids during a manipulation.

16. An insulating element for sealing off a structural element in a motor vehicle, the insulating element comprising:

a carrier; and an expandable material that is arranged on the carrier;

wherein the carrier has at least one cap and is formed in such a way that, when a plurality of identical insulating elements are stacked, respective caps of adjacent insulating elements engage in one another, the cap is formed in such a way that, when a plurality of identical insulating elements are stacked, respective caps of adjacent insulating elements lie on one another, and the cap has a stopper which defines a support location when a stack is being formed.

17. A method for attaching insulating elements to structural elements in motor vehicles, the method comprising:

providing a system having stacked insulating elements comprising:

a carrier; and an expandable material that is arranged on the carrier; wherein the carrier has at least one cap and is formed in such a way that, when a plurality of identical insulating elements are stacked, respective caps of adjacent insulating elements engage in one another, and the insulating elements are stacked on top of one another with the respective caps of adjacent insulating elements engaging in one another manipulating the insulating elements by an application robot, wherein at least one cap serves as a positioning aid for the application robot.

18. The insulating element as claimed in claim 1, wherein the cap has a cross-section with a portion that corresponds to a cube, a cylinder or a trapezoid.

* * * * *